(12) United States Patent
Nissen

(10) Patent No.: US 10,706,682 B2
(45) Date of Patent: Jul. 7, 2020

(54) GAMING CHIPS AND TABLE GAME SECURITY SYSTEM

(71) Applicant: David Nissen, Henderson, NV (US)

(72) Inventor: David Nissen, Henderson, NV (US)

( * ) Notice: Subject to any disclaimer, the term of this patent is extended or adjusted under 35 U.S.C. 154(b) by 0 days.

(21) Appl. No.: 16/252,874

(22) Filed: Jan. 21, 2019

(65) Prior Publication Data
US 2019/0156629 A1    May 23, 2019

Related U.S. Application Data

(63) Continuation of application No. 15/442,982, filed on Feb. 27, 2017, now Pat. No. 10,210,709, which is a continuation of application No. 12/221,493, filed on Aug. 4, 2008, now Pat. No. 9,589,220.

(60) Provisional application No. 60/963,345, filed on Aug. 4, 2007.

(51) Int. Cl.
*G07F 17/32* (2006.01)
*G06K 19/067* (2006.01)
*A63F 3/00* (2006.01)

(52) U.S. Cl.
CPC ....... *G07F 17/3251* (2013.01); *G06K 19/067* (2013.01); *G07F 17/3227* (2013.01); *A63F 2003/00703* (2013.01)

(58) Field of Classification Search
CPC .................... G07F 17/32; A63F 13/86
See application file for complete search history.

(56) References Cited

U.S. PATENT DOCUMENTS

| | | | | |
|---|---|---|---|---|
| 5,895,321 A | * | 4/1999 | Gassies | A44C 21/00 273/148 R |
| 6,756,441 B2 | * | 6/2004 | Amou | C08F 212/14 524/575 |
| 2006/0092079 A1 | | 5/2006 | De Rochemont | |
| 2006/0279420 A1 | * | 12/2006 | Charlier | A44C 21/00 340/539.1 |
| 2007/0090545 A1 | * | 4/2007 | Condie | H01L 23/4334 257/789 |
| 2007/0105616 A1 | | 5/2007 | Chapet et al. | |
| 2007/0197299 A1 | * | 8/2007 | Miller | A44C 21/00 463/43 |
| 2007/0216534 A1 | | 9/2007 | Ferguson et al. | |
| 2008/0068177 A1 | | 3/2008 | Copeland | |
| 2009/0224985 A1 | | 9/2009 | Pohjonen | |
| 2010/0311494 A1 | * | 12/2010 | Miller | G07F 17/32 463/22 |

* cited by examiner

*Primary Examiner* — Reginald A Renwick
(74) *Attorney, Agent, or Firm* — David Duckworth

(57) ABSTRACT

Gaming chips are provided with embedded radio frequency identification ("RFID") tags incorporated into a gaming chip for identifying and tracking the gaming chips within a casino, and even upon a gaming table. The gaming chips have a body in the shape of a disc which has a loss tangent of 0.0078 or less, and more preferably of 0.007 or less. For chips operating at 900 MHz, the body has a dielectric constant of 5 or less, and preferably 3-5. For chips operating at 2.45 GHz, the body has a dielectric constant of 5-8. Preferably, the body is made of a blend of plastic, such as PVC, and a dielectric ceramic. The RFID is preferably sandwiched between layers of a high frequency circuit material including top and bottom layers and a center layer have a hole for receiving the RFID. Preferably, the layers of high frequency circuit material have a dielectric constant of 2.5-4 and a loss tangent of 0.002-0.006.

8 Claims, No Drawings

GAMING CHIPS AND TABLE GAME SECURITY SYSTEM

RELATED APPLICATIONS

This application is a continuation application of U.S. patent application Ser. No. 15/442,982 filed Feb. 27, 2017, which in turn is a continuation application of U.S. patent application Ser. No. 12/221,493 filed Aug. 4, 2008, now U.S. Pat. No. 9,589,220 issued on Mar. 7, 2017, which in turn is a continuation-in-part application of U.S. Provisional Application No. 60/963,345 filed on Aug. 4, 2007.

BACKGROUND OF THE INVENTION

The present invention relates to casino gaming. More specifically, the present invention relates to systems and methods for conducting and tracking transactions at table games and other locations on the floor of a casino or other gaming establishment. Casino gaming is a multibillion dollar industry in which table games remain an immensely popular form of gaming and a substantial source of revenue. Table games include Poker, Blackjack, Craps, Roulette, Pai-Gow, Caribbean Stud, Spanish 21 and Let it Ride, among many others.

A primary concern of casinos is the management and tracking of gaming chips, markers or plaques used by players and casino personnel to make wagers, pay out winnings and the like. In the United States, gaming chips typically come in various denominations such as one dollar, five dollars, twenty-five dollars, one hundred dollars, one thousand dollars and ten thousand dollars. Other countries use a wide variety of denominations and currencies for gaming chips. Due to the gaming chip's value and importance in tracking their use, various systems have been developed for tracking gaming chip transactions. For example, numerous U.S. patents describe the use of radio frequency identification ("RFID") tags incorporated into a gaming chip for identifying and tracking the gaming chips within a casino, and even upon a gaming table. Gaming chips including an RFID tag are read using RFID readers employing various antenna in a casino, such as within a casino vault, casino chip tray or casino gaming table. To track player involvement, it is known to provide a separate antenna reader at each player position.

Unfortunately, basic RFID gaming chips suffer from several drawbacks. For example, the various RFID antenna within a gaming table often fail to detect gaming chips nearby, but will often read gaming chips at other positions. Alternatively, gaming chips can be read by more than one antenna providing a false indication that a gaming chip is in two places at once. In addition, it has been proven to be extremely difficult to read all of the chips within a large stack of chips. A large number of randomly unstacked chips is also difficult to read by RFID antenna.

Thus, there is a need for a system for accurately and automatically tracking gaming chips through a casino and particularly at a gaming table. Furthermore, it would be desirable to provide improved gaming chips which incorporate greater security features within the RFID tags.

SUMMARY OF THE INVENTION

Previously, gaming chips, including those that have incorporated an RFID, have typically been made of polyvinylchloride (PVC). Unfortunately, PVC is not particularly conducive to the operation of an imbedded RFID. More particularly, it has been discovered that the dielectric constant is not particularly conducive to the operation of the RFID. In particular, PVC has a dielectric constant of 1-3 and a loss tangent of greater than 0.008. When blended with a common filler, barium sulfate, the traditional gaming chip typically has a dielectric constant of greater than 4 and a loss tangent of greater than 0.008. It has been discovered that this loss tangent is too high for optimal operation of an embedded RFID.

The present invention is directed to a gaming chip constructed for optimal operation of an internally embedded RFID. The gaming chip includes a body forming the exterior of the gaming chip. In addition, the gaming chip includes an internal RFID which is encapsulated by the gaming chip's body during the manufacturing process.

The gaming chip's body is made of a material having a loss tangent of 0.0078 or less, and more preferably a loss tangent of 0.007 or less. A loss tangent of 0.005 would be even more optimal. The body has a loss tangent within this range regardless of the operational frequency of the embedded RFID. However, the dielectric constant for the gaming chip's body may differ depending on the frequency band within which the RFID is operating.

Preferably, the RFID operates at the 900 MHz, 2.45 GHz or 5.8 GHz operational bands specified by the Federal Communications Commission ("FCC"). For gaming chips incorporating an RFID operating at 5.8 GHz, it is desirable that the gaming chip's body be manufactured of a material having a loss tangent of 0.002 or less, and more preferably of a material having an extremely low loss tangent of less than 0.001.

Where the gaming chip incorporates an RFID operating at a frequency band of 900 MHz, it is preferred that the body have a dielectric constant of 5 or less. More preferably, it is preferred that the body's dielectric constant be between 3-5. In the event that the gaming chip includes an RFID intended to operate at the 2.45 GHz range, it is preferred that the body has a dielectric constant of 5-8.

The gaming chip's body may be made from a variety of materials. However, it is preferred that the body be made of a blend of plastic and a dielectric ceramic. A preferred plastic is polyvinylchloride (PVC). Meanwhile, preferred dielectric ceramics include aluminum oxide (alumina), magnesium titanate, zinc oxide, zirconium barium titanate, strontium titanate (ST), calcium titanate (CT), magnesium titanate (MT), calcium magnesium titanate (CMT), zinc titanate (ZT), lanthanum titanate (TLT), and neodymium titanate (TNT), barium zirconate (BZ), calcium zirconate (CZ), lead magnesium niobate (PMN), lead zinc niobate (PZN), lithium niobate (LN), barium stannate (BS), calcium stannate (CS), magnesium aluminium silicate, magnesium silicate, barium tantalate, titanium dioxide, niobium oxide, zirconia, silica, sapphire, beryllium oxide, and zirconium tin titanate, and combinations thereof.

The RFID may be embedded within the gaming chip's body employing various techniques known to those skilled in the art. However, existing premier gaming chips are manufactured by compression molding a blend of PVC and barium sulfate under extreme pressure and temperature. Typical RFIDs cannot withstand the pressure which would be encountered within a traditional compression molding process. Accordingly, it is preferred that the RFIDs be placed within a protective capsule prior to withstanding a compression molding process within the formation of the gaming chip's body. The protective capsule may take various forms. However, it is preferred that the protective capsule be made of a material having a dielectric constant of between 2-5 and a loss tangent of 0.001-0.0078. Even more preferably, the capsule for protecting the RFID has a dielectric constant of 2.5-4 and a loss tangent of 0.02-0.006. In a preferred embodiment, the protective capsule is made by providing three layers of high frequency circuit material. Preferably a first layer of high frequency circuit material is positioned above the RFID. A second layer of high frequency circuit material is positioned below the RFID. Finally, a third layer of high frequency circuit material is formed with a center hole for receiving the RFID. The three layers are affixed together with the RFID positioned within the center layer's central hole to completely encapsulate the RFID for protection within a compression molding process.

Advantageously, the gaming chip is optimally constructed for operation of an embedded RFID.

It is thus an object of the present invention to provide a gaming chip which can be tracked within a casino environment.

It is still an additional object of the present invention to provide a gaming chip which is inexpensive and easily manufactured.

Other features and advantages of the present invention will be appreciated by those skilled in the art upon reading the detailed description which follows.

DETAILED DESCRIPTION OF THE INVENTION

While the present invention is susceptible of embodiment in its various forms, there will be hereinafter be described the presently preferred embodiments of the invention with the understanding that the present disclosure is to be considered as exemplifications of the invention and it is not intended to limit the invention to the specific embodiments illustrated.

The gaming chip's body is preferably made of a material having a loss tangent of 0.0078 or less. Even more preferably, the gaming chip body is made of a material having a loss tangent of 0.007 or less, and even more preferably of 0.005 or less. In some constructions, a material having a loss tangent of 0.001 or less may be desirable for optimal operation of an embedded RFID.

Furthermore, it has been discovered that a dielectric constant of less than 5, and preferably between 3-5, is advantageous for the body of a gaming chip including an imbedded RFID operating at 900 MHz. Meanwhile, it has discovered that a dielectric constant of 4.5-15 is advantageous for a gaming chip to provide better operation of an imbedded RFID operating at 2.45 GHz. A gaming chip employing a body having a dielectric constant of 5-8 is considered ideal for use with an imbedded RFID operating at 2.45 GHz.

A gaming chip having a desirable dielectric constant can be manufactured by combining plastic materials with dielectric ceramic materials. Various plastic materials may be employed. However, semi-rigid PVC is considered ideal for numerous reasons including the fact that the weight, feel, and sound provided by a PVC gaming chip has been long recognized by gamblers as desirable. Meanwhile, acceptable dielectric ceramics include aluminum oxide (alumina), magnesium titanate, zinc oxide, zirconium barium titanate, strontium titanate (ST), calcium titanate (CT), magnesium titanate (MT), calcium magnesium titanate (CMT), zinc titanate (ZT), lanthanum titanate (TLT), and neodymium titanate (TNT), barium zirconate (BZ), calcium zirconate (CZ), lead magnesium niobate (PMN), lead zinc niobate (PZN), lithium niobate (LN), barium stannate (BS), calcium stannate (CS), magnesium aluminium silicate, magnesium silicate, barium tantalate, titanium dioxide, niobium oxide, zirconia, silica, sapphire, beryllium oxide, and zirconium tin titanate, and combinations thereof.

Of these dielectric ceramics, aluminum oxide (alumina), magnesium titanate, zinc oxide, or a combination of aluminum oxide (alumina) blended with zinc oxide or barium sulfate are believed preferred dielectric materials for use within a gaming chip having an RFID operating at 900 MHz. Barium zirconate is considered preferred, alone or in combination with barium titanate or barium sulphate for use within a gaming chip having an RFID operating at 2.45 GHz.

The gaming chips of the present invention may be constructed to have various dimensions. However, for use in the United States it is preferred that the gaming chip be constructed in accordance with Nevada Gaming Regulation 12.040 which specifies that gaming chips must be 0.130 inches thick and have a diameter of 1.55 inches for games other than Baccarat. For Baccarat, the gaming chips must be 1.55 inches or 1.6875 inches. Meanwhile, in accordance with Regulation 12.040, it is preferred that gaming chips for race books or sports pools have a diameter of 1.6875 inches. Though not discussed in detail, the constructions of the present invention may also be employed within gaming tokens, such as those constructed in accordance with Nevada Gaming Commission Regulation 12.050, as well as gaming plaques and gaming markers. The Nevada Gaming Commission Regulations are incorporated by reference herein in their entirety.

To form the gaming chips for operating at 2.45 MHz, the plastic, preferably semi-rigid PVC, is blended with the dielectric ceramic, preferably barium zirconate, to have a dielectric constant of 4.5-15, or more preferably 5-8. The determination of the ratios for the plastic and barium zirconate can be determined by one skilled in the art without undue experimentation, as such ratios will vary depending on the particular dielectric constant desired and the dielectric constants of the PVC and barium zirconate employed. For example, it is thought that PVC has a dielectric constant which can range from 1-3, while barium zirconate has a dielectric constant of 10-30 and a loss tangent of about 0.006-0.007. After blending, the material is compression molded to create gaming chips.

To form the gaming chips for operating at 900 MHz, the plastic, again preferably semi-rigid PVC, is blended with the dielectric ceramic, preferably aluminum oxide, magnesium titanate, zinc oxide, and/or combinations thereof, to have a dielectric constant of 5 or less, or more preferably between 3-5. The determination of the ratios for the plastic and the dielectric ceramic can be determined by one skilled in the art without undue experimentation, as such ratios will vary depending on the particular dielectric constant desired and the dielectric constants of the PVC and dielectric employed. Again, after blending, the material is compression molded to create gaming chips.

An RFID is embedded within the gaming chip of the present invention. In a first embodiment, the gaming chip operates at the 900 MHz range specified by the Federal Communications Commission ("FCC"). The 900 MHz ISM band is defined in the United States as 915 MHz±13 MHz. In still an additional embodiment of the present invention, the RFIDs for use with the gaming chip of the present invention operate at 2.4 GHz in a range specified by the FCC as 2.45 GHz±50 MHz. In still an additional embodiment of the invention, the RFIDs for use with the gaming chips of the present invention operate at 5.8 GHz which is specified by the FCC as a range of 5.8 GHz±75 MHz. However, if an RFID is chosen to operate at the 5.8 GHz range, it is desirable that the gaming chip be manufactured of a material having an extremely low loss tangent of less than 0.001.

RFIDs operating at 900 MHz for use with the present invention can be purchased by Impinj, Inc. of Seattle, Wash. and NXP, a company founded by Phillips. Meanwhile, RFIDs operating at 2.45 GHz for use with gaming chips of the present invention can be purchased from Claridy, Inc. of Taiwan or Neology, Inc. of Poway, Calif.

Though various antenna constructions for use with the RFID may be designed by those skilled in the art, in a preferred embodiment, the RFID including antenna and integrated circuit, is sandwiched between layers of high frequency integrated circuit material typically used for integrated circuit substrates. Acceptable materials are known in the industry as "Rogers" material. Substrate printed circuit board materials from Arlon, Inc. of Santa Ana, Calif. may also be employed. It is preferred that the high frequency circuit material has a dielectric constant of 2.5-4 and a loss tangent of 0.002-0.006. Acceptable materials include Rogers 4003 and Arlon CLTE.

Preferably, the sandwiching includes three rectangular layers of high frequency circuit material including top and bottom layers having sufficient length and width to extend just beyond the extremities of the RFID's antenna. Meanwhile, the middle layer of a high frequency circuit material which preferably has the same dimensions as the top and bottom layers, but also includes a central hole positioned for receipt of the RFID's integrated circuit. As would be understood by those skilled in the art, RFIDs are manufactured in various shapes and sizes. For example, RFIDs operating at 2.45 GHz are typically rectangular. For these RFIDs, it is preferred that the sandwiching includes three layers high frequency circuit material which are rectangular including rectangular top and bottom layers having sufficient length and width to extend beyond the extremities of the RFID's antenna. The middle layer of high frequency circuit material is also rectangular with a rectangular center hole sized for receipt of the RFID. Conversely, RFIDs operating at 900 MHz are often round. For these RFIDs, it is preferred that the sandwiching includes three layers high frequency circuit material which are circular including circular top and bottom layers having sufficient length and width to extend beyond the extremities of the RFID's antenna. The middle layer of high frequency circuit material is also circular with a circular center hole sized for receipt of the RFID.

As would be understood by one skilled in the art, this middle layer protects the integrated circuit during the compression molding process by preventing the outer layers from compressing the integrated circuit and thereby causing unwanted damage. Of importance, the high frequency circuit material has a dielectric constant and a loss tangent appropriate for not interfering with the operation of the RFID. In addition, the layers of materials provide protection for the RFID during the compression molding of the gaming chip.

The invention claimed is:

1. A gaming chip comprising:
an RFID transmitter; and
a cylindrical body having a shape and size of a gaming chip, said body encapsulating said RFID transmitter, said body having a loss tangent of 0.0078 or less and a dielectric constant of 4.5-8, and said body comprises a blend of a plastic and a dielectric ceramic selected from the group consisting of aluminum oxide, magnesium titanate, zinc oxide, magnesium titanate (MT), zinc titanate (ZT), barium zirconate (BZ), barium titanate, barium sulphate, barium stannate (BS), barium tantalate, and zirconia, and combinations thereof.

2. The gaming chip of claim 1 wherein said gaming chip has a thickness of 0.130 inches and a diameter of 1.55 inches or 1.6875 inches, and said body is a blend of plastic and a dielectric ceramic selected from the group consisting of barium zirconate, barium titanate and barium sulphate, and combinations thereof.

3. The gaming chip of claim 1 wherein said RFID transmitter operates in a frequency band of 915 MHz±13 MHz.

4. The gaming chip of claim 2 wherein said RFID transmitter operates in a frequency band of 2.45 GHz±50 MHz.

5. The gaming chip of claim 1 further comprising a capsule encapsulating said RFID transmitter with said body encapsulating both said capsule and said RFID transmitter, said capsule made of a high frequency circuit material having a loss tangent of 0.002-0.006 and a dielectric constant of 2.5-4.

6. A gaming chip comprising:
an RFID transmitter operating in a frequency band of 915 MHz±13 MHz;
a capsule encapsulating said RFID transmitter made of a high frequency circuit material having a loss tangent of 0.002-0.006 and a dielectric constant of 2.5-4; and
a body having a shape and size of a cylindrical gaming chip having a thickness of 0.130 inches and a diameter of 1.55 inches or 1.6875 inches, said body encapsulating said capsule and said RFID transmitter, said body having a loss tangent of 0.0078 or less and a dielectric constant of 4.5-8, and said body comprises a plastic and a dielectric ceramic selected from the group consisting of aluminum oxide, magnesium titanate, zinc oxide, magnesium titanate (MT), zinc titanate (ZT), barium zirconate (BZ), barium titanate, barium sulphate, barium stannate (BS), barium tantalate, and zirconia, and combinations thereof.

7. The gaming chip of claim 6 wherein said body is a blend of plastic polyvinylchloride and a dielectric ceramic selected from the group consisting of barium zirconate, barium titanate and barium sulphate, and combinations thereof.

8. The gaming chip of claim 6 further comprising a capsule encapsulating said RFID transmitter with said body encapsulating both said capsule and said RFID transmitter, said capsule made of a high frequency circuit material having a loss tangent of 0.002-0.006 and a dielectric constant of 2.5-4.

* * * * *